Patented Oct. 7, 1941

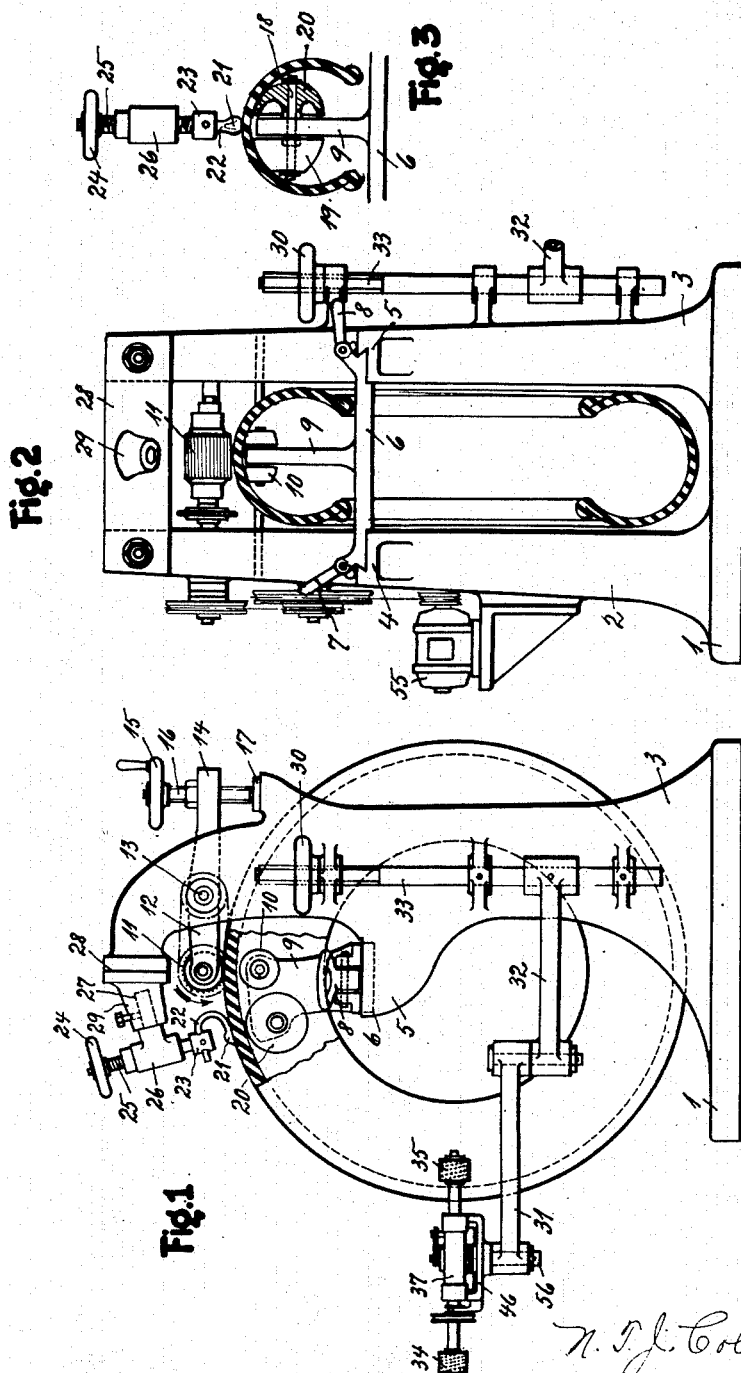

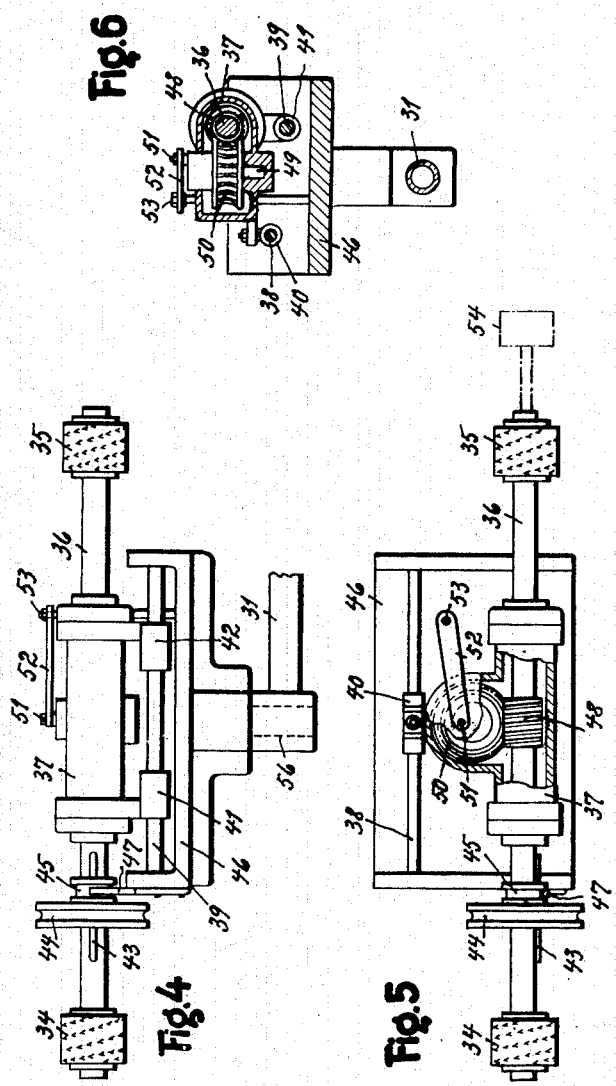

2,258,378

UNITED STATES PATENT OFFICE 2,258,378

MACHINE FOR PREPARING PNEUMATIC TIRES FOR RETREADING

Nanno Theodor Jürgen Collmann, Lubeck, Germany

Application May 13, 1939, Serial No. 273,558
In Germany June 1, 1938

18 Claims. (Cl. 29—33)

This invention relates to a machine for the preparation of worn pneumatic motor vehicle tires for retreading. Such preparation consists essentially in more or less removing, by cutting away, the worn layer of rubber from the foundations. Machines for this purpose are already known in which the tread surface of a vertically rotating tire is cut away by means of a horizontally rotating disc knife, the normal profile of the tire having previously been altered by spreading and pressing devices.

The present invention relates to a machine in which the tire is held in the operative position by supporting rollers, conforming to the inner profile of the tire, then the rubber covering to be removed, is peeled off in narrow strips by means of a U-shaped knife and finally roughening rollers having radially pointed teeth are operated for roughening the cut surface, the roughening rollers being mounted on a jointed swinging arm rotatable about a vertical pivot.

A machine according to the invention is illustrated by way of example on the accompanying drawings, in which:

Fig. 1 is a side elevation of the machine, a tire mounted thereon being shown partly in section.

Fig. 2 is a front elevation of the machine, the tire thereon being shown in cross section.

Fig. 3 is a front elevation of the cutting knife and associated profiled supporting roller.

Figs. 4, 5 and 6 are respectively a side elevation, plan and vertical cross section on a larger scale of the roughening device.

The machine comprises a frame having two uprights 2, 3 on a base plate 1, each upright being provided with a bracket 4, 5. On the latter, a slide 6 is slidingly supported in lateral guides and can be withdrawn forwardly and locked in position by handles 7, 8.

A web 9 is provided at the middle of the slide 6, on which feed rollers 10 are rotatably mounted. A preferably toothed feed roller 11, provided vertically above the feed or supporting rollers 10, is mounted on the arm 12 of a two-armed lever pivoted about an axis 13, the other arm 14 of which carries a screw spindle 16, which bears against a plate 17, which latter is spring-mounted on the machine frame. By turning the screw spindle 16 by means of the hand wheel 15, the gap between the feed rollers 10 and 11 can be increased or decreased to conform to the thickness of the tire to be treated, to adjust the pressure of the roller 11 on the tire. The spring-mounted plate 17 permits yielding of the feed roller 11 on encountering an increased thickness in the tire, by depressing the spindle 16 under the increased load.

A supporting means consisting preferably of two independently rotatable rollers 19 and 20 is mounted on a spindle 18 provided in front of the feed rollers 10, 11. The spindle 18 of the supporting rollers 19, 20 is interchangeably mounted in the intermediate web 9 of the slide 6, so that a specific supporting roller or rollers can be applied depending upon the size and shape of the internal profile of the tire to be retreaded. The two-part construction of the supporting means is of advantage as it materially decreases friction.

A cutting tool 21 is mounted above the supporting rollers 19, 20. This tool consists of a gouge-like knife with an approximately half round and sharp cutting edge, the bowed stem 22 of which is composed of a round bar. The particular configuration of the knife is intended to cause the rubber to be peeled off in narrow strips and the peeled off strips freely pass on either side of the stem of the knife. The shaft or stem 22 of the knife 21 is interchangeably secured by a set screw in a holder 23, which is rotatably connected to a screw spindle 25 provided with a hand-wheel 24. A head 26, in which the screw spindle is rotatably mounted, is provided with a stem 27 mounted in a socket 29 which latter is provided on a cross bar 28.

A jointed arm 31, 32, vertically adjustable by a screw spindle 33 which latter is rotated by means of a hand-wheel 30, is mounted to swing on the frame of the machine, and on the free end thereof a device is rotatably mounted on a vertical pivot 56 for roughening the cut surface of the tire. This device, as illustrated on enlarged scale in Figs. 4–6, consists of a shaft 36, provided at each of its ends with a roughening roller 34, 35, which is rotatably mounted in a housing 37 by means of ball bearings, and which can reciprocate by bushes 40, 41, 42 sliding on rods 38, 39. The roughening rollers 34, 35 receive their rotation by means of a belt pulley 44 mounted on a key 43 on the shaft 36. The pulley 44 constrained against displacement in the longitudinal direction on the shaft by means of a claw 47 secured by screws to the channel frame 46 and which is engaged in a corresponding annular groove 45 in the pulley 44.

A multiple screw-threaded worm gear 48 is provided on the shaft 36 and is in engagement with a bevel gear 50 rotatably mounted on a journal 49 mounted in the housing 37. The gear 50 has an eccentric pin 51 extending through the cover of the housing and to which a link 52 is pivotally connected, the other end of the link being pivotally connected to a stem 53 mounted upright in the frame 46.

The shaft 36 may be bored at each end to receive a cleaning brush 54, indicated in dot-dash lines in Fig. 5, to rotate therewith.

The machine is driven by a motor 55, the rotation of which is transmitted to the shaft of the feed roller 11 by a speed reduction gear. The roughening rollers are driven by a separate motor, not shown, which is mounted on the jointed arm 31, 32.

The machine operates as follows:

After the slide 6 has been removed from the frame of the machine, the tire can be inserted so that it is positioned between the two uprights 2, 3. The knife as well as the feed roller 11 are previously adjusted to an elevated position so that, when the slide 6 is replaced on its bracket, the feed roller 10 as well as the supporting rollers 19, 20 adjust themselves unconstrainedly into the inner profile of the tire. Thereupon the feed roller 11 is pressed by means of the screw 16 firmly down on to the external profile of the tire and thereupon set in rotation. The tire thereby receives a circular motion and the knife 21, now lowered by the screw 25 in contact with the tire, cuts into the rubber layer to be removed from the tire and peels it off in narrow strips under the counter pressure of the supporting roller 19, 20. As the knife 21 is vertically adjustable as well as laterally, the entire tire profile can, as far as necessary, be cut, without altering the location of the tire.

To retread the tire it is necessary to roughen the cut surface of the profile of the tire. After adjusting the knife 21 into an inoperative position, one of the roughening rollers 34 or 35 is pressed by hand against the cut surface of the tire. On rotation of the shaft 36 the bevel gear 50 is rotated by the worm gear 48, so that by means of the eccentric connection of the link 52, a reciprocating motion is imparted to the housing 37 and therewith also to the roughening rollers 34, 35. The formation of concentric grooves in the work is thereby avoided in roughening tires and air tubes, since as a matter of fact intercrossing undulating lines are formed by the teeth of the roughening rollers.

I claim:

1. A machine for preparing worn tires for retreading, comprising a frame, a slide mounted on the frame, means on the frame for removably supporting the slide, a pair of supporting rollers on said slide which are adapted to support a tire to be prepared by the internal contour of the tire rolling on said rollers, a cutting tool adjustably mounted on the frame and adapted to contact the external contour of the tire opposite one of the supporting rollers, feed roller means adjustably mounted on the frame of which the roller is adapted to contact the tire opposite the other of said supporting rollers to impart a circular motion to the tire for the cutting operation, and means for locking the slide on the supporting means.

2. A machine for preparing worn tires for retreading, comprising a frame in the form of a base plate with two spaced uprights and each upright having a bracket thereon, a slide removably mounted on the brackets, a pair of supporting rollers on said slide which are adapted to support a tire between the uprights by the internal contour of the tire rolling on said rollers, a cutting tool adjustably mounted on the uprights and adapted to contact the external contour of the tire opposite one of the supporting rollers, and feed roller means adjustably mounted in the uprights of which the feed roller is adapted to contact the tire opposite the other of said supporting rollers to impart a circular motion to the tire for the cutting operation.

3. A machine according to claim 1, in which the slide includes a web in which the supporting rollers are mounted to freely rotate thereon and each supporting roller is in the form of two rollers of which each roller is freely rotatable and is mounted on one side of the web.

4. A machine for preparing worn tires for retreading, comprising a frame, a slide removably mounted on the frame, a pair of supporting rollers on said slide which are adapted to support a tire to be prepared by the internal contour of the tire rolling on said rollers, a cutting tool adjustably mounted on the frame and adapted to contact the external contour of the tire opposite one of the supporting rollers, feed roller means adjustably mounted on the frame of which the roller is adapted to contact the tire opposite the other of said supporting rollers to impart a circular motion to the tire for the cutting operation, the feed roller means comprising an arm pivotally mounted intermediate its ends in the frame with its feed roller at one end thereof, and means at the other end to swing the arm on its pivot relative to the frame to adjust the feed roller toward and away from the external contour of the tire.

5. A machine for preparing worn tires for retreading, comprising a frame, a slide removably mounted on the frame, a pair of supporting rollers on said slide which are adapted to support a tire to be prepared by the internal contour of the tire rolling on said rollers, a cutting tool adjustably mounted on the frame and adapted to contact the external contour of the tire opposite one of the supporting rollers, feed roller means adjustably mounted on the frame of which the roller is adapted to contact the tire opposite the other of said supporting rollers to impart a circular motion to the tire for the cutting operation, the feed roller means comprising an arm pivotally mounted intermediate its ends in the frame with its feed roller at one end thereof, means at the other end to swing the arm on its pivot relative to the frame to adjust the feed roller toward and away from the external contour of the tire, and means for driving the feed roller.

6. In a machine for preparing worn tires for retreading, a supporting means for rotatably supporting the tire to be prepared comprising a removable slide having means for locking the slide on the machine, a web mounted on the slide and provided with a spindle, and a roller mounted on each side of the web freely rotatable on the spindle, each roller having a peripheral contour corresponding to the internal contour of the tire and the slide being removed with its web and rollers from the machine to insert or remove the tire to be treated.

7. A supporting means according to claim 6, in which the slide is mounted in the machine on lateral guides and in which the means on the slide to removably secure the slide on the lateral guides includes a pair of handles.

8. In a machine for preparing worn tires for retreading, a supporting means for rotatably supporting the tire to be prepared comprising a web provided with a pair of spindles, a feed roller rotatably mounted on each side of the web on one of the spindles, and a supporting roller rotatably mounted on each side of the web on the other spindle, each roller having a peripheral contour corresponding to the internal contour of the tire.

9. In a machine for preparing worn tires for retreading, a roughening device comprising a jointed arm mounted at one end on the machine, a frame mounted on the other end of said arm, a housing mounted on said frame, a shaft rotatably mounted in the housing and having a roughening tool mounted thereon, means for rotating said shaft, and means for imparting a reciprocating motion to the housing and by means of the latter the shaft and thereby the tool is moved back and forth across the rotating tire to cut intercrossing lines in the tire by the tool.

10. In a machine for preparing worn tires for retreading, a roughening device comprising a housing, means for adjustably mounting the housing to the machine, a shaft rotatably mounted in the housing and having a roughening tool mounted thereon, means for slidably supporting the housing on the first-mentioned means, and means for reciprocating the housing on the slidable supporting means and therewith the shaft and tool upon rotation of the shaft to cut intercrossing lines in the tire by the tool.

11. In a machine for preparing worn tires for retreading, a roughening device comprising a housing, means for adjustably mounting the housing to the machine, a shaft rotatably mounted in the housing and having a roughening tool mounted thereon, means for reciprocating the housing and therewith the shaft and tool upon rotation of the shaft to cut intercrossing lines in the tire by the tool, and a jointed arm secured at one end to the housing, the adjustable mounting being connected to the other end of the arm to vertically adjust the housing, shaft and tool relative to the tire to be treated.

12. In a machine for preparing worn tires for retreading, a roughening device comprising a housing, means for adjustably mounting the housing to the machine, a shaft rotatably mounted in the housing and having a roughening tool mounted thereon, means for reciprocating the housing and therewith the shaft and tool upon rotation of the shaft to cut intercrossing lines in the tire by the tool, and a frame having a pair of rods on which the housing is slidably mounted for the reciprocating motion of the housing, shaft and tool.

13. In a machine for preparing worn tires for retreading, a roughening device comprising a housing, means for adjustably mounting the housing to the machine, a shaft rotatably mounted in the housing and having a roughening tool mounted thereon, means for reciprocating the housing and therewith the shaft and tool upon rotation of the shaft to cut intercrossing lines in the tire by the tool, a frame having a pair of rods on which the housing is slidably mounted for the reciprocating motion of the housing, shaft and tool, and an eccentric device mounted on the frame and is connected to the housing for the reciprocating motion.

14. In a machine for preparing worn tires for retreading, a roughening device comprising a housing, a shaft rotatably mounted in the housing and having a roughening tool mounted thereon, a frame, a pair of bars secured in said frame and on which said housing together with the shaft and tool are adapted to reciprocate upon rotation of the shaft to cut intercrossing lines in the tire by said tool, and means for reciprocating the housing and shaft upon rotation of the latter.

15. A roughening device according to claim 14, in which the last-mentioned means includes a worm gear mounted on the shaft, a second gear rotatably mounted in the housing and meshing with the worm gear, and a link secured at one end to the frame and the other end pivoted to the second gear at a point remote from the axis of rotation of the second gear.

16. In a machine for preparing worn tires for retreading, a roughening device comprising a housing, means for adjustably mounting the housing to the machine, a shaft rotatably mounted in the housing and having a roughening tool mounted thereon, means for reciprocating the housing and therewith the shaft and tool upon rotation of the shaft to cut intercrossing lines in the tire by the tool, and means for rotating the shaft comprising a pulley keyed on the shaft to permit a sliding action relative to the shaft.

17. In a machine for preparing worn tires for retreading, a roughening device comprising a housing, means for adjustably mounting the housing to the machine, a shaft rotatably mounted in the housing and having a roughening tool mounted thereon, means for reciprocating the housing and therewith the shaft and tool upon rotation of the shaft to cut intercrossing lines in the tire by the tool, means for rotating the shaft comprising a pulley keyed on the shaft to permit a sliding action relative to the shaft, and means secured to the pulley and connected to a stationary part to prevent longitudinal displacement of the pulley relative to said stationary part.

18. A machine for preparing worn tires for retreading, comprising a frame, a tool mounted on said frame for cutting the outer surface of the tire, a feed roller on the frame for rotating the tire, a pair of supporting rollers mounted to rotate freely on the frame and under the tool, and a pair of supporting rollers mounted to rotate freely on the frame and under the feed roller, each of said supporting rollers contacting the inner surface of the tire and supporting the tire during its treatment and each supporting roller having a circumferential contour conforming to the inner surface of the tire.

NANNO THEODOR JÜRGEN COLLMANN.